United States Patent
Fujishima et al.

(10) Patent No.: US 6,836,698 B2
(45) Date of Patent: Dec. 28, 2004

(54) MAINTENANCE SYSTEM FOR MACHINE TOOL

(75) Inventors: Makoto Fujishima, Yamatokoriyama (JP); Masahiro Komatsu, Yamatokoriyama (JP); Akio Karyu, Yamatokoriyama (JP); Kingo Maeda, Yamatokoriyama (JP); Yuichi Nakazawa, Yamatokoriyama (JP); Shizuo Nishikawa, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 10/802,744

(22) Filed: Mar. 18, 2004

(65) Prior Publication Data

US 2004/0193307 A1 Sep. 30, 2004

(30) Foreign Application Priority Data

Mar. 26, 2003 (JP) ........................................ 2003-085192

(51) Int. Cl.[7] .............................................. G06F 19/00
(52) U.S. Cl. ........................ 700/169; 700/108; 702/182
(58) Field of Search ................................ 700/169–170, 700/174, 175, 179, 108–110; 702/182, 183, 184, 185, 188

(56) References Cited

U.S. PATENT DOCUMENTS

2001/0053939 A1 * 12/2001 Crevel et al. .................. 700/9
2002/0103563 A1 * 8/2002 Izawa et al. ................. 700/121
2002/0128728 A1 * 9/2002 Murakami et al. ............ 700/10
2002/0183880 A1 * 12/2002 Arima et al. ................ 700/110
2003/0023454 A1 * 1/2003 Aiuchi et al. .................. 705/1

FOREIGN PATENT DOCUMENTS

| JP | 2001-315010 | 11/2001 |
|---|---|---|
| JP | 2001-315037 | 11/2001 |
| WO | WO00/12259 | 3/2000 |

* cited by examiner

*Primary Examiner*—Leo Picard
*Assistant Examiner*—Zoila Cabrera
(74) *Attorney, Agent, or Firm*—Westerman, Hattori, Daniels & Adrian, LLP

(57) ABSTRACT

The invention relates to a maintenance system for machine tool. In the maintenance, system 1, a user management apparatus 10 connected to a numerical control section of a machine tool 15, and a manufacturer management apparatus 20 disposed on a side of a manufacturer are connected to each other via Internet 5. The user management apparatus 10 collects data relating to an operating condition of each driving mechanism of the machine tool 15, and accumulates the data. When a predetermined transmission condition is satisfied, the user management apparatus 10 transmits the accumulated operating condition data to the manufacturer management apparatus 20 in the form of an electronic mail. The manufacturer management apparatus 20 evaluates the consumption degree of each driving mechanism based on the received operating condition data, and outputs an alarm when the consumption degree exceeds a reference value.

7 Claims, 10 Drawing Sheets

F I G. 7

| n | MACHINE ID | DATE AND TIME | MAIN SPINDLE LOAD (%) | MAIN SPINDLE ROTATION SPEED (min$^{-1}$) | NUMBER OF TOOL EXCHANGES | NUMBER OF TOOL CLAMPING/UNCLAMPING |
|---|---|---|---|---|---|---|
| 1 | SL2530102 | 2000/2/21 19:01:00 | 30 | 2000 | 0 | 0 |
| 2 | SL2530102 | 2000/2/21 19:01:01 | 32 | 2000 | 0 | 0 |
| 3 | SL2530102 | 2000/2/21 19:01:02 | 34 | 2000 | 0 | 0 |
| 4 | SL2530102 | 2000/2/21 19:01:03 | 55 | 5000 | 0 | 0 |
| .... | .... | .... | .... | .... | .... | .... |

FIG. 8

HEADER PORTION
{
Date: Fri, 22 Feb 2002 07:59:18
Subject: *********
To: **@**.co.jp
From: **@**.co.jp
}

MAIL TEXT PORTION
{
<SERIAL_NUMBER>
"SL2530102"
</SERIAL_NUMBER>
<M_MCNDTL>
30
</M_MCNDTL>
<M_MCNSTS>
2000
</M_MCNSTS>
<M_MNFRSL>
0
</M_MNFRSL>
<M_ALMHIS>
0
</M_ALMHIS>
}

FIG. 9

| ITEM | TAG |
|---|---|
| MACHINE ID | <SERIAL_NUMBER> |
| MAIN SPINDLE LOAD | <M_MCNDTL> |
| MAIN SPINDLE ROTATION SPEED | <M_MCNSTS> |
| TOOL EXCHANGE | <M_MNFRSL> |
| TOOL CLAMPING/UNCLAMPING | <M_ALMHIS> |

FIG. 13

HEADER PORTION
- Date: Fri, 22 Feb 2002 07:59:18
- Subject: *********
- To: **@**.co.jp
- From: **@**.co.jp

MAIL TEXT PORTION

As to NC machine tool SL2530102 of user **** , the consumption degree of bearings of the main spindle apparatus has reached to 80% of the life value.

MAINTENANCE SYSTEM FOR MACHINE TOOL

BACKGROUND OF THE INVENTION

1. Field of the Invention

The present invention relates to a maintenance system for machine tools which has: one or more user management apparatuses connected to numerical control sections of one or more machine tools each including a driving mechanism section and a numerical control section for controlling the operation of the driving mechanism section; and a manufacturer management apparatus disposed on the side of a manufacturer who manufactures the machine tools, and in which the user management apparatuses and the manufacturer management apparatus are connectable to one another via the Internet.

2. Description of the Prior Art

A large number of components each having its use limit, i.e. the life are used in a driving mechanism section constituting a machine tool. In a main spindle apparatus, for example, a bearing is used for rotatably supporting a main spindle. A coned disc spring is used in a clamp mechanism section for fixing a tool to the main spindle. Also in a feed mechanism section, a bearing is used for rotatably supporting a ball screw.

If the life of such a consumable component reaches the end thereof, it is necessary to exchange the component. If the life can be correctly predicted, a component to be exchanged can be previously prepared, or the corresponding component can be exchanged in an interval of operations in view of the production plan. Such an exchange is advantageous because the production plan is not disturbed by repair.

However, the life of such a consumable component is largely varied in accordance with the operating conditions of the machine tool, and hence it is usually difficult to correctly predict the timing when the life of the component is ended. When the life of a component is ended at an unanticipated timing and the component is broken, therefore, there arises a problem in that the machine tool cannot be operated in order to repair the component, and the production plan is disadvantageously disturbed. In another case such as that where there is no stock of components identical with the broken component and it takes a long time period to prepare the component, the machine tool cannot be restored for a long term, thereby causing another problem in that the production plan must be largely amended.

Depending on the operating condition of the machine tool when the component is broken, there may arise a case where also another component(s) is broken. In such a case, the repair requires an additional time period.

On the other hand, a manufacturer who manufactures the machine tool does not know when, which, and how many consumable components are required. Therefore, it is necessary for the manufacturer to always store a fixed number or more components as stocks for safety, in order to avoid a case where the component is out of stock when a user requires the component.

In addition, maintenance persons on both of the user and manufacturer's sides are required to deal with such problems in their off-hours such as holidays or nighttime. Therefore, the working conditions of the maintenance persons are bad.

The invention has been conducted in view of the above-mentioned circumstances. It is an object of the invention to provide a maintenance system in which planned maintenance of a machine tool can be efficiently performed, and the rate of operation of the machine tool can be enhanced.

SUMMARY OF THE INVENTION

In order to attain the object, the invention provides a maintenance system for machine tools, comprising: one or more user management apparatuses connected to numerical control sections of one or more machine tools each including a driving mechanism section, and the numerical control section which controls an operation of the driving mechanism section; and a manufacturer management apparatus disposed on a side of a manufacturer who manufactures the machine tools, the user management apparatuses and the manufacturer management apparatus being connectable to each other via the Internet, wherein each of the user management apparatuses comprises:

user-side operation data storing means for storing data relating to an operating condition of the driving mechanism section of each of the machine tools; and data transmitting means for collecting data relating to the operating condition of the driving mechanism section from the numerical control section, for accumulating the data into the user-side operation data storing means, for checking whether a predetermined transmission condition is satisfied or not, and for, only when the transmission condition is satisfied, transmitting the operating condition data of the driving mechanism section accumulated in the user-side operation data storing means to the manufacturer management apparatus, in a data form of an electronic mail, and the manufacturer management apparatus comprises:

manufacturer-side operation data storing means for storing operating condition data of the driving mechanism sections received from the user management apparatuses;

data receiving means for receiving the operating condition data of the driving mechanism sections transmitted from the user management apparatuses, and for updating operating condition data stored in the manufacturer-side operation data storing means with the received operating condition data;

consumption degree data storing means for storing data relating to a consumption degree of each of the driving mechanism sections;

consumption degree evaluating means for evaluating at any time the consumption degree of each of the driving mechanism sections, based on the operating condition data of the driving mechanism section stored in the manufacturer-side operation data storing means, and for updating consumption degree data stored in the consumption degree data storing means with the evaluated consumption degree data; and alarm outputting means for monitoring at any time whether the consumption degree data stored in the consumption degree data storing means exceeds a predetermined reference value or not, and for, when the consumption degree data exceeds the reference value, outputting an alarm indicating this condition.

According to the invention, first, the data transmitting means of each of the user management apparatuses collects the data (operating condition data) relating to the operating conditions of the driving mechanism sections from the numerical control section of each machine tool, and the data is accumulated in the user-side operation data storing means.

As the driving mechanism section, for example, useful are a main spindle apparatus, a clamp mechanism section for fixing a tool to a main spindle, a feed mechanism section, and an automatic tool exchange apparatus. Bearings disposed in the main spindle apparatus, the feed mechanism section, and the automatic tool replacing apparatus, coned disc springs disposed in the clamp mechanism section, and the like correspond to components (consumable components) having use limits (lives). In addition to these components, the consumable components may include oil for an oil cooler, lubricating oil supplied and circulated in a gearbox, and a backup battery for backing up a memory in the numerical control apparatus.

The operating condition can be grasped as items relating to a main spindle rotation speed, a tool exchange instruction, a tool clamp/unclamp instruction, an axis movement instruction, and the like. The operating condition data is constituted by data corresponding to the items, and stored in the user-side operation data storing means while the corresponding items and data are correlated to one another.

It is checked at any time whether the predetermined transmission condition is satisfied or not. Only when the transmission condition is satisfied, the operating condition data of the driving mechanism sections accumulated in the user-side operation data storing means is transmitted to the manufacturer management apparatus in the data form of an electronic mail.

The transmitted operating condition data is received by the data receiving means. The operating condition data of the driving mechanism sections stored in the manufacturer-side operation data storing means is updated with the received operating condition data.

The consumption degree evaluating means evaluates at any time the consumption degree of each of the driving mechanism sections, based on the operating condition data of the driving mechanism section stored in the manufacturer-side operation data storing means. The consumption data stored in the consumption degree data storing means is updated with the evaluated consumption degree data.

As for the consumption degree data stored in the consumption degree data storing means, the alarm output means monitors at any time whether the data exceeds the predetermined reference value or not. If it is ascertained that the data exceeds the reference value, the alarm indicating the condition is output.

In the case of a bearing, for example, the consumption degree of the driving mechanism section is an operating amount at the present time caused by wear and the like of the rolling element, with respect to the operating limit. In the case of a coned disc spring, for example, the consumption degree is a fatigue amount at the present time caused by repeated load acting on the spring, with respect to the fatigue limit. The reference value is a value indicating that the life of a consumable component comes close to the end thereof. As the reference value, for example, a value which is 80% of the operating limit or the fatigue limit may be appropriately set.

As for the output form of the alarm, information of the driving mechanism section may be displayed on, for example, a screen of a display device such as a CRT disposed in the manufacturer management apparatus. Alternatively, information of the driving mechanism section may be printed out by a printing apparatus such as a printer similarly disposed in the manufacturer management apparatus.

As described above, according to the maintenance system for machine tools of the invention, the consumption degree of a driving mechanism section of each machine tool is evaluated and monitored at any time. When the consumption degree exceeds the predetermined reference value, that is, when the life of the consumable component of the driving mechanism section comes close to the end thereof, an alarm is output. Based on the output alarm, therefore, the manufacturer can easily know a consumable component the life of which comes close to the end thereof, and predict when, which, and how many consumable components are required. Consequently, it is unnecessary to store an excess number of consumable components, and the number of stocks can be greatly reduced.

The manufacturer can perform maintenance services for the users, such as that the manufacturer prompts in advance the users to replace the components or sends in advance a component required for the replacement to the users. Therefore, the service for the users can be improved.

On the other hand, the users can know the timing when the life of a consumable component is ended, based on the information supplied from the manufacturer, so that it is possible to systematically perform the maintenance of the machine tool by replacing the component before the life is ended. Accordingly, the operating efficiency and the productivity of the machine tool can be improved.

Since it is possible to systematically perform the maintenance of the machine tool as described above, disadvantages such as that the maintenance person must repair the machine tool in the holiday or nighttime can be eliminated.

Irrespective of the places where the user management apparatus as the source and the manufacturer management apparatus as the destination are installed, the operating condition data collected and accumulated by the user management apparatus can be flexibly transmitted from the user management apparatus to the manufacturer management apparatus, simply by designating the address of the destination. In addition, data without any omission in terms of time can be transmitted to the manufacturer management apparatus.

The data transmitting means and the data receiving means may have the following configurations, instead of the above-described configurations. Specifically, the data transmitting means is configured for collecting data relating to the operating condition of the driving mechanism section from the numerical control section, for accumulating the data into the user-side operation data storing means, for checking whether a predetermined transmission condition is satisfied or not, for, only when the transmission condition is satisfied, generating transmission data based on the operating condition data of the driving mechanism section accumulated in the user-side operation data storing means, and for transmitting the generated transmission data to the manufacturer management apparatus, the transmission data having a configuration in which a data element identifier defining an item relating to the operating condition of the driving mechanism section is related to the operating condition data corresponding to the item. The data receiving means is configured for receiving the transmission data transmitted from the user management apparatus, for analyzing the data element identifier in the received transmission data, thereby recognizing an item relating to the operating condition of the driving mechanism section defined by the data element identifier, and for updating the operating condition data of the driving mechanism section and stored in the manufacturer-side operation data storing means, the operating condition data corresponding to the recognized item, with the received operating condition data.

According to the configuration, in a manner similar to that in the above-described configuration, the data transmitting means first collects data relating to the operating conditions of the driving mechanism sections from the numerical control section of each machine tool, and the data is accumulated in the user-side operation data storing means.

It is checked at any time whether the predetermined transmission condition is satisfied or not. Only when the transmission condition is satisfied, a process of transmitting the operating condition data accumulated in the user-side operation data storing means is performed.

Specifically, the operating condition data of each driving mechanism section is organized into transmission data having a configuration in which a data element identifier for defining an item relating to an operating condition of the driving mechanism section is related to the operating condition data corresponding to the item. The data element identifier is a so-called tag. The item relating to an operating condition is defined by the tag. For example, the operating condition data is organized into transmission data having a structure in which the data is sandwiched by such tags. The transmission data generated in this manner is transmitted to the manufacturer management apparatus.

The transmitted transmission data is received by the data receiving means. The data element identifier is analyzed, and the item relating to the operating condition of each driving mechanism defined by the data element identifier is recognized. Among the data of the driving mechanism sections stored in the manufacturer-side operation data storing means, the operating condition data corresponding to the recognized item is updated with the received operating condition data.

The transmission data transmitted from the user management apparatus has a structure in which an item relating to the operating condition of each driving mechanism section and data of the operating condition are correlated with each other, so that the operating condition data corresponding to the item of the operating condition can be easily identified. Therefore, the data updation can be correctly performed. The items of data to be accumulated can be easily added and changed.

The data transmitting means may be configured so that it is connected to the Internet only when the operating condition data accumulated in the user-side operation data storing means is to be transmitted to the manufacturer management apparatus, the operating condition data is then transmitted, and, after the transmission is completed, the connection to the Internet is disconnected.

According to the configuration, the user management apparatus is connected to the Internet only when the operating condition data is to be transmitted, and hence safety from any unauthorized access and computer virus can be greatly enhanced.

The transmission condition may be a condition which is set for an amount of data accumulated in the user-side operation data storing means. In this case, the data transmitting means compares the data amount accumulated in the user-side operation data storing means with a reference data amount serving as the transmission condition, and, when the accumulated data amount reaches the reference data amount, transmits the operating condition data accumulated in the user-side operation data storing means to the manufacturer management apparatus.

Alternatively, the transmission condition may be a condition which is set for a time period required for the data accumulation. In this case, the data transmitting means compares the time period required for the data accumulation with a reference time period serving as the transmission condition, and, when the time period of the data accumulation exceeds the reference time period, transmits the operating condition data accumulated in the user-side operation data storing means to the manufacturer management apparatus.

According to the configuration, the operating condition data accumulated in the user-side operation data storing means can be appropriately transmitted at an adequate timing. It is possible to prevent data to be accumulated in the user-side operation data storing means from being discarded because the data amount exceeds the capacity of the storing means. Thus, the operating condition data can be made more correct.

In another aspect, the invention provides a maintenance system for machine tools, comprising: one or more user management apparatuses connected to numerical control sections of one or more machine tools each including a driving mechanism section, and the numerical control section for controlling an operation of the driving mechanism section; and a manufacturer management apparatus disposed on a side of a manufacturer who manufactures the machine tools, the user management apparatuses and the manufacturer management apparatus being connectable to each other via the Internet, wherein each of the user management apparatuses comprises:

operation data storing means for storing data relating to an operating condition of the driving mechanism section of each of the machine tools;

data accumulating means for collecting data relating to the operating condition of the driving mechanism section from the numerical control section, and for accumulating the data into the operation data storing means;

consumption degree data storing means for storing data relating to a consumption degree of the driving mechanism section of the machine tool;

consumption degree evaluating means for evaluating at any time the consumption degree of the driving mechanism section, based on operating condition data of the driving mechanism section stored in the operation data storing means, and for updating consumption degree data stored in the consumption degree data storing means with the evaluated consumption data; and consumption degree transmitting means for monitoring at any time whether the consumption degree data stored in the consumption degree data storing means exceeds a predetermined reference value or not, and for, when the data exceeds the reference value, transmitting information of the consumption degree in the form of an electronic mail to the manufacturer management apparatus.

According to the invention, first, the data accumulating means of each of the user management apparatuses collects data relating to the operating conditions of the driving mechanism sections from the numerical control section of each machine tool, and the data is accumulated into the operation data storing means.

The consumption degree evaluating means evaluates at any time the consumption degrees of the respective driving mechanism sections, based on the operating condition data of the driving mechanism sections stored in the operation data storing means. The consumption degree data stored in the consumption degree data storing means is updated with the evaluated consumption degree data.

As for the consumption degree data stored in the consumption degree data storing means, the consumption degree transmitting means monitors at any time whether the data exceeds the predetermined reference value or not. If it is ascertained that the data exceeds the reference value, the information relating to the consumption degree is transmitted to the manufacturer management apparatus in the form of an electronic mail.

As described above, according to the maintenance system for machine tools of the invention, the consumption degree of the driving mechanism section of each machine tool is evaluated and monitored at any time. When the consumption degree exceeds the predetermined reference value, that is, when the life of a consumable component of the driving mechanism section comes close to the end thereof, information of the consumption degree is transmitted from the user management apparatus to the manufacturer management apparatus. Based on the transmitted information, therefore, the manufacturer can easily know the consumable component the life of which comes close to the end thereof. Consequently, both of the manufacturer and the user can enjoy the same effects as those attained by the above-described maintenance system.

The consumption degree transmitting means may be configured so that it is connected to the Internet only when the information of the consumption degree is to be transmitted to the manufacturer management apparatus, the information of the consumption degree is then transmitted, and, after the transmission is completed, the connection to the Internet is disconnected. According to the configuration, in the same manner as described above, safety from any unauthorized access and computer virus can be greatly enhanced.

BRIEF DESCRIPTION OF THE DRAWINGS

FIG. 7 is a view illustrating the structure of data stored in an operation data storing section in the embodiment;

FIG. 8 is a view illustrating an example of an electronic mail in the embodiment;

FIG. 9 is a view illustrating automatic generation of an electronic mail in the embodiment;

FIG. 13 is a view illustrating an example of an electronic mail in the other embodiment of the invention.

DESCRIPTION OF THE PREFERRED EMBODIMENT

Hereinafter, preferred embodiments of the invention will be described with reference to the accompanying drawings.

Figure 1:
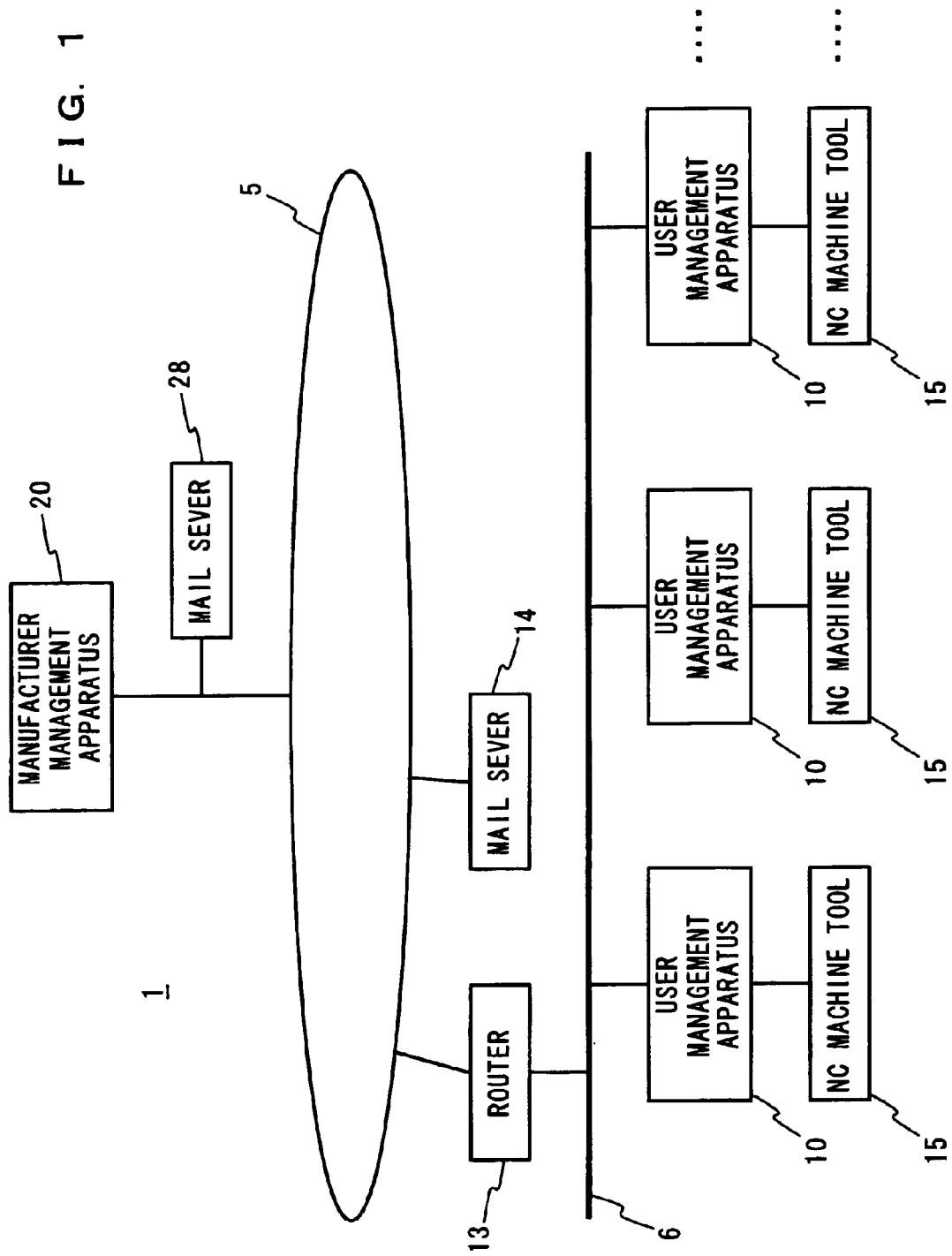
FIG. 1 is a block diagram schematically showing the configuration of a maintenance system for machine tools of a preferred embodiment of the invention.

As shown in FIG. 1, a maintenance system 1 of the embodiment comprises: a plurality of user management apparatuses 10 respectively connected to NC machine tools 15; and a manufacturer management apparatus 20 disposed on the side of a manufacturer who manufactures the NC machine tools 15. The user management apparatuses 10 and the manufacturer management apparatus 20 are connected to one another via the Internet 5.

First, the configuration of the NC machine tool 15 in the embodiment is schematically described.

Figure 2:
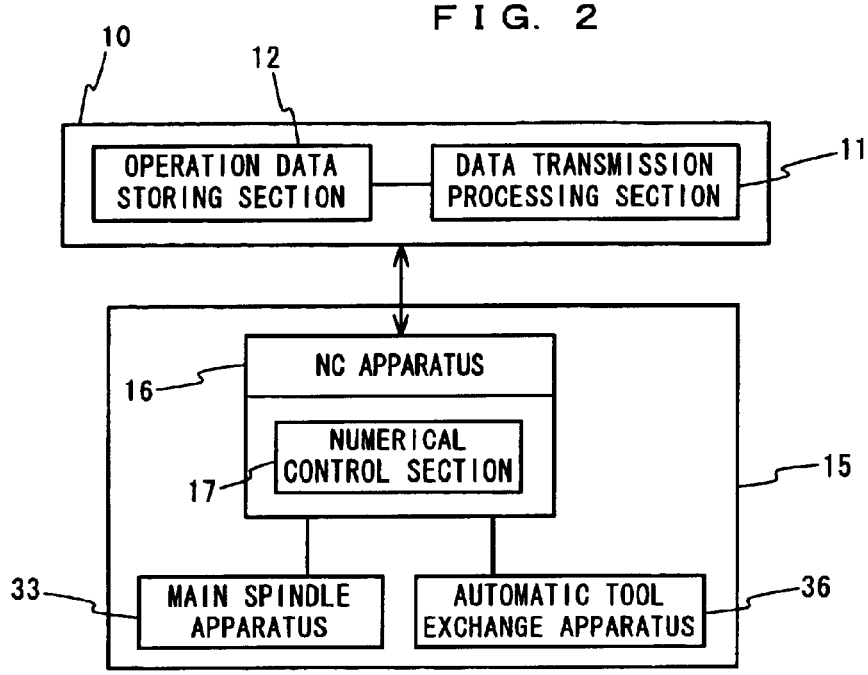
FIG. 2 is a block diagram schematically showing the configuration of a user management apparatus and an NC machine tool in the embodiment.
Figure 4:
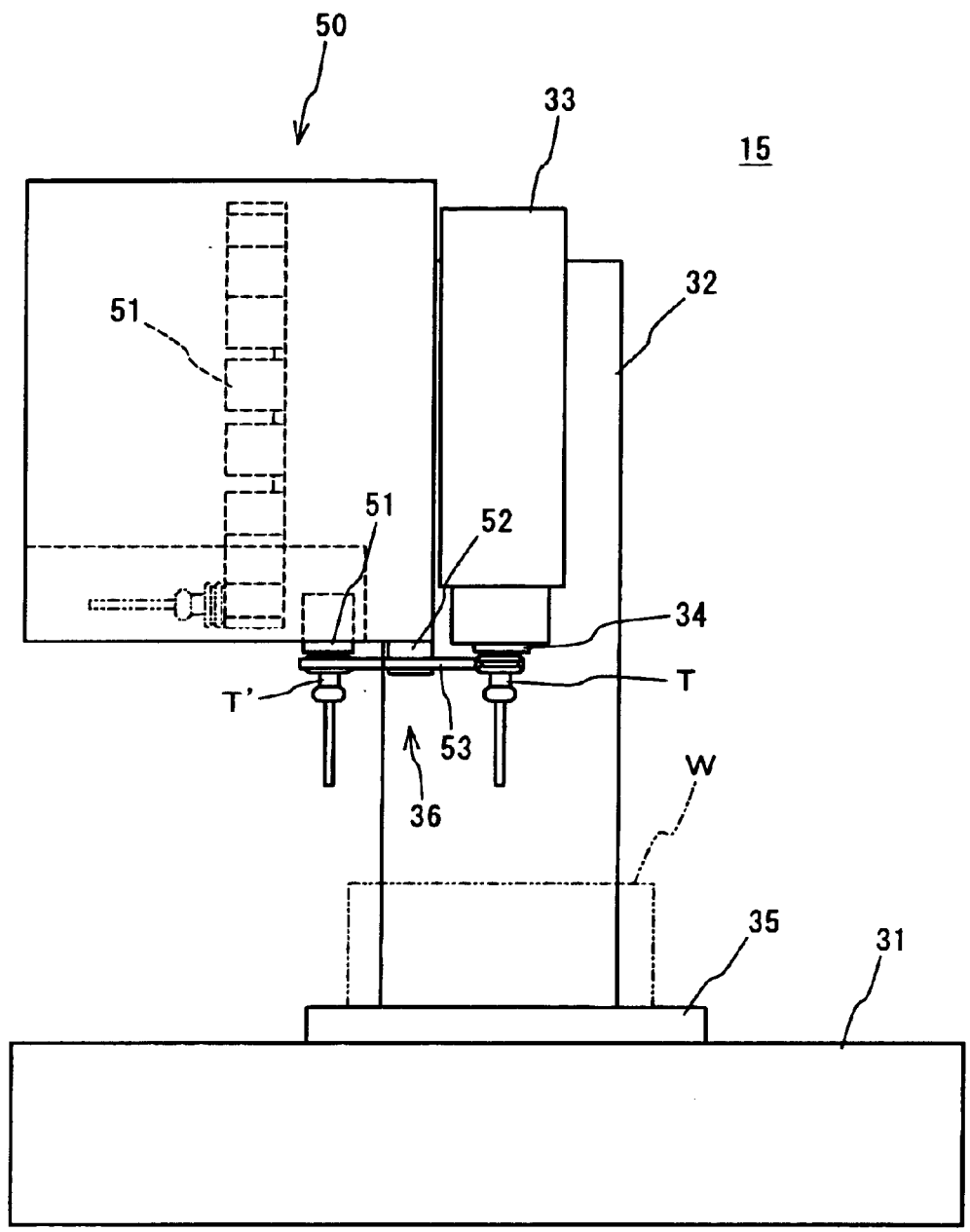
FIG. 4 is a front view schematically showing the configuration of the NC machine tool in the embodiment.

As shown in FIGS. 2 and 4, the NC machine tool 15 is configured by: a bed 31; a column 32 which is fixed onto the bed 31; a main spindle apparatus 33 which is supported by the column 32 in a vertically movable manner, and which rotatably supports a main spindle 34; a table 35 which is disposed on the bed 31 in a horizontally movable manner, and on which a workpiece W is to be placed; a feed mechanism section (not shown) which moves the main spindle apparatus 33 and the table 35 in their respective movable directions; an automatic tool exchange apparatus 36 which exchanges a tool T attached to the main spindle apparatus 33 for another new tool T; and an NC apparatus 16 having a numerical control section 17 which controls the operations of the main spindle apparatus 33, the automatic tool exchange apparatus 36, the feed mechanism section (not shown), and the like.

Figure 5:
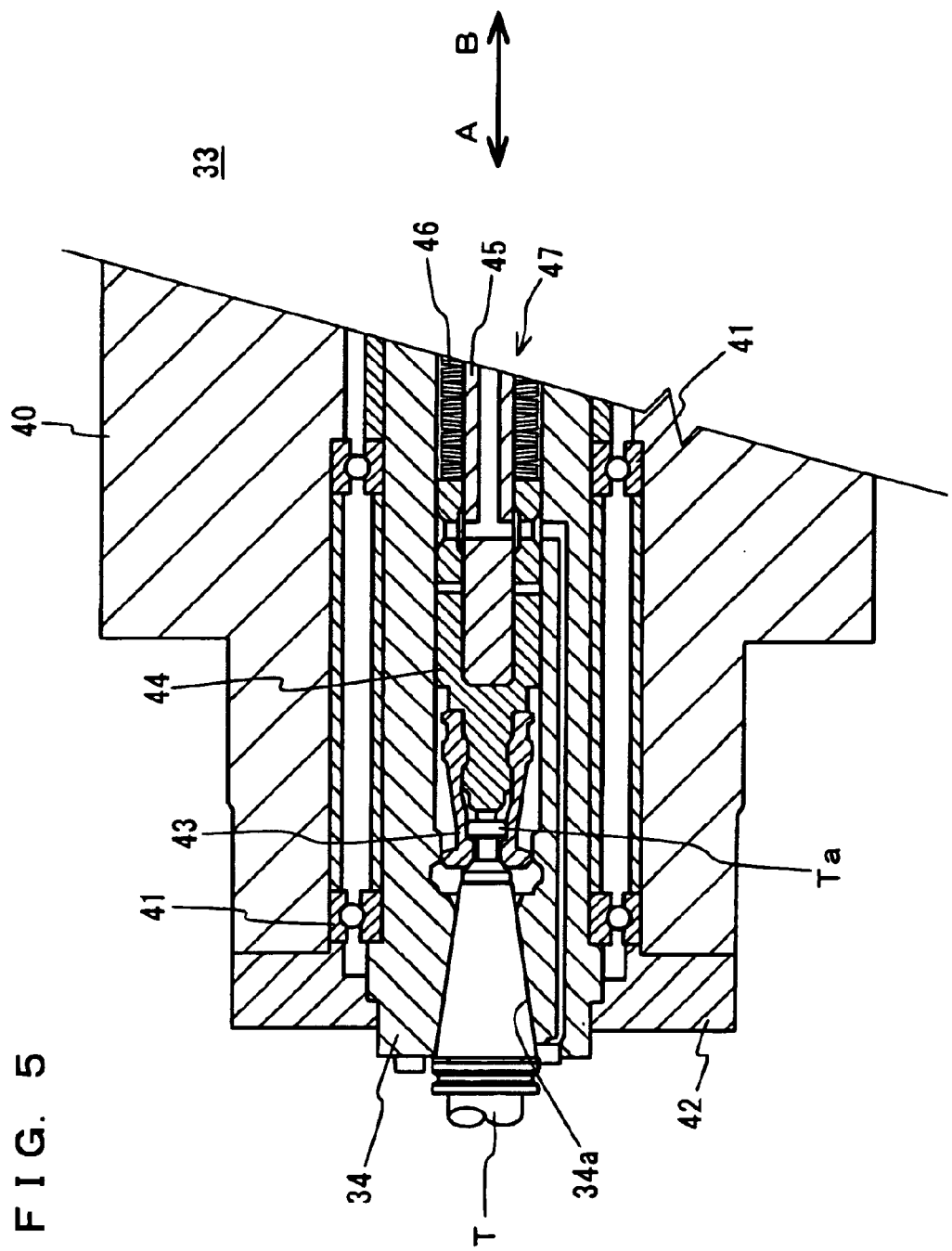
FIG. 5 is a section view schematically showing the configuration of a main spindle apparatus of the NC machine tool shown in FIG. 4.

As shown in FIG. 5, the main spindle apparatus 33 comprises the main spindle 34 in which a tapered hole 34a to which the tool T is to be attached is formed, a housing 40 which rotatably supports the main spindle 34 via a bearing 41, a cover 42 which is disposed in a lower end portion of the housing 40, a main spindle motor (not shown) which rotates the main spindle 34 about the axis thereof.

In addition, the main spindle apparatus 33 comprises a clamp mechanism 47 consisting of: a collet 43 which is disposed in the main spindle 34, and which can grasp a pull stud (to-be-grasped portion) Ta of the tool T; a push-pull rod 44 which is engaged with the collet 43; a driving rod 45 which is coupled to the push-pull rod 44; a coned disc spring 46 which urges the driving rod 45 in the direction of the arrow B; a hydraulic cylinder (not shown) which moves the driving rod 45 in the direction of the arrow A; and the like.

With the provision of the clamp mechanism 47, when the driving rod 45 is moved in the direction of the arrow A by the hydraulic cylinder (not shown) against the urging force of the coned disc spring 46, the push-pull rod 44 and the collet 43 are also moved in the direction of the arrow A. As a result, a tip end portion of the collet 43 is opened, so that the tool T can be pulled out of the main spindle 34. By contrast, when, in this condition (in the condition where the tip end portion of the collet 43 is opened), the tool T is attached to the tapered hole 34a of the main spindle 34 and the operation of the hydraulic cylinder (not shown) is then stopped, the driving rod 45 is moved in the direction of the arrow B by the urging force of the coned disc spring 46, so that the collect 43 is closed. Therefore, the tool T is grasped by the collet 43 in a condition where the pull stud Ta is drawn in the direction of the arrow B.

Figure 6:
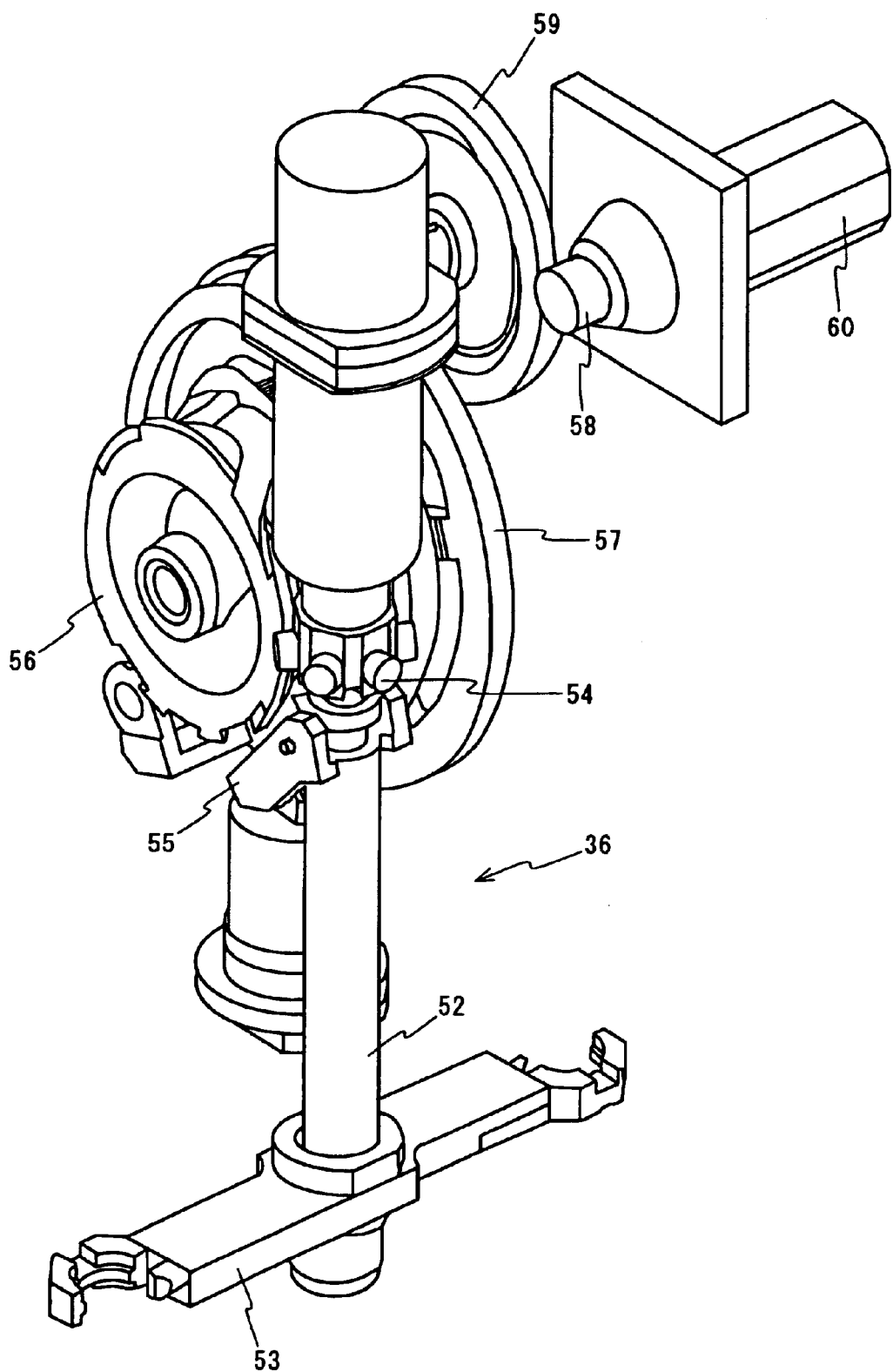
FIG. 6 is a perspective view schematically showing the configuration of an automatic tool exchange apparatus of the NC machine tool shown in FIG. 4.

As shown in FIGS. 4 and 6, the automatic tool exchange apparatus 36 comprises: a tool magazine 50 which is disposed at the side of the main spindle apparatus 33, and which houses a plurality of tools T' in a condition where the tools are held in respective holding pots 51; a rotation shaft 52 which is disposed in parallel to the main spindle 34; a exchange arm 53 which is fixedly disposed on a lower end portion of the rotation shaft 52, and which is used for exchanging the tool T attached to the main spindle 34 for the tool T' held in the holding pot 51; roller-like cam followers 54 which are protrudingly disposed at regular angles on the outer circumference of a middle portion of the rotation shaft 52, and which rotate the rotation shaft 52 about the axis thereof; a lever-like cam follower 55 which is engaged with the rotation axis 52 directly under the cam followers 54, and which moves the rotation shaft 52 in the axial direction; a roller gear cam 56 in which a guide groove formed in the outer circumference is engaged with the cam follower 54, and a guide groove formed in an end face is engaged with the cam follower 55; a gear 57 which is integrally and fixedly formed on the roller gear cam 56; and a driving motor 60 which transmits a rotation power to the gear 57 via transmission gears 58 and 59.

The cam follower 54 has a structure in which an engagement roller engaged with the outer circumference guide groove is rotatably supported by a bearing (not shown). The cam follower 55 also has a structure in which an engagement roller engaged with the end face guide groove is rotatably supported by a bearing (not shown).

With the provision of the automatic tool exchange apparatus 36, the rotation power of the driving motor 60 is transmitted to the roller gear cam 56 via the gears 58, 59, and 57. When the roller gear cam is rotated about the axis, the rotation shaft 52 is rotated about the axis thereof by means of the operation of the cam followers 54 engaged with the roller gear cam. In addition, by means of the operation of the cam follower 55 which is similarly engaged with the roller gear cam, the rotation shaft 52 is moved in the axial direction. As a result of the operation of the rotation shaft 52, the tool exchange by the exchange arm 53 is performed.

Based on an instruction signal included in a machining program, or the like, the numerical control section 17 controls the operations of the main spindle motor (not shown) of the main spindle apparatus 33, the hydraulic cylinder (not shown) of the clamp mechanism 47, the driving motor 60 of the automatic tool exchange apparatus 36, and a driving motor (not shown) of the feed mechanism section, etc.

Based on an instruction signal relating to the rotation speed of the main spindle, for example, the numerical control section drives and controls the main spindle motor (not shown) so as to rotate the main spindle 34 at the instructed rotation speed. Based on a tool clamp/unclamp instruction, the operation of the hydraulic cylinder (not shown) is controlled so as to clamp or unclamp the tool T attached to the main spindle 34. Furthermore, based on a tool exchange instruction, the driving motor 60 is driven so as to perform the tool exchange.

Next, the user management apparatuses 10 and the manufacturer management apparatus 20 will be specifically described.

A. User Management Apparatus

As shown in FIGS. 1 and 2, each of the user management apparatuses 10 is configured by a data transmission processing section 11 and an operation data storing section 12. The user management apparatus is connected to the NC apparatus 16 of the NC machine tool 15 in a one-to-one relationship, and also to the Internet 5 via a LAN 6 and a router 13.

The operation data storing section 12 is a functioning section which stores data (operating condition data) relating to the operating condition which is collected by the data transmission processing section 11. The data transmission processing section 11 performs an accumulation process of collecting operating condition data of driving mechanism sections such as the main spindle apparatus 33 and the automatic tool exchange apparatus 36 from the numerical control sections 17, and accumulating the data into the operation data storing section 12, and also a transmission process of transmitting the operating condition data accumulated in the operation data storing section 12 to the manufacturer management apparatus 20.

In the accumulation process, information of the operating conditions (operating condition data) such as main spindle load, the main spindle rotation speed, the tool exchange instruction, and the tool clamp/unclamp instruction which are instructed to respective sections by the numerical control section 17 is taken out from the numerical control section 17, and the information is then stored into the operation data storing section 12 as a data table such as shown in FIG. 7.

As shown in FIG. 7, the data table contains items of machine ID, (collection) date and time, main spindle load, main spindle rotation speed, number of tool exchanges, and number of tool clamping/unclamping operations. A value of a load meter per second (unit of %) is stored as the main spindle load, and a value of an instructed main spindle rotation speed per second ($min^{-1}$) is stored as the main spindle rotation speed. As for the tool exchange and the tool clamp/unclamp, each time when the operation is instructed, the number of instructions is incremented, and the number of instructions accumulated in one second is stored.

On the other hand, the transmission process is performed when a predetermined transmission condition is satisfied. For example, the transmission condition may include the amount of data accumulated in the operation data storing section 12, and transmission intervals of transmission data. In the case where the transmitting condition is set as the data amount, when the amount of data stored in the operation data storing section 12 reaches a predetermined data amount, the transmission process is performed. In the case where the transmitting condition is set as the transmission intervals, when a predetermined time period elapses after the previous transmission process, the next transmission process is performed.

In another case, also when an operator presses a transmission switch which is provided as required, the transmission process is performed. This is performed for the following reason. The data stored in the operation data storing section 12 is lost when the power of the NC machine tool 15 is turned off. When the power of the NC machine tool 15 is to be turned off, therefore, the transmission switch is pressed, so that the data after the previous transmission can be transmitted. Accordingly, the data transmitted to the manufacturer management apparatus 20 can be made more correct.

When the transmission process is started, the processes described below are sequentially performed. First, a process of automatically generating transmission data in the electronic mail data form including the operating condition data as shown in FIG. 8 is performed based on the operating condition data stored in the operation data storing section 12.

The electronic mail is constituted by a header portion including source and destination mail addresses, and a mail text portion. The mail text includes a tag (data element identifier) for defining an item relating to an operating condition (see FIG. 9), and operating condition data corresponding to the item. The mail text has a form in which the operating condition data is described with being sandwiched by corresponding tags.

An example will be described with reference to FIG. 8. A tag of <M_MCNSTS> indicates that data of the main spindle rotation speed exists after this tag, and the succeeding tag of </M_MCNSTS> indicates that the data of the main spindle rotation speed velocity exists before the tag.

After the electronic mail is automatically generated as described above, the next process is performed. In the process, the user management apparatus is connected to the Internet 5, and the generated electronic mail is transmitted to a mail server which is previously designated, i.e., to the manufacturer management apparatus 20. In the embodiment, the electronic mail is transmitted to a mail server 14 via the router 13, and then transferred from the mail server 14 to a mail server corresponding to the designated mail address, i.e., a mail server 28 in the embodiment.

Figure 3:
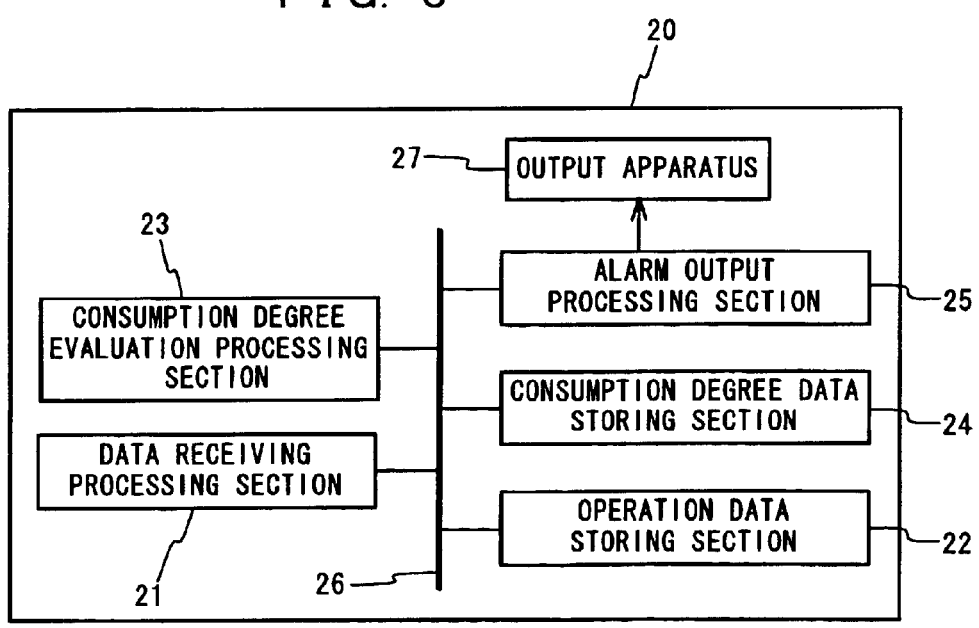
FIG. 3 is a block diagram schematically showing the configuration of a manufacturer management apparatus in the embodiment.

Next, it is checked whether the transmission of the mail succeeds or not. If the transmission succeeds, the process is ended. If the transmission fails, the transmission is repeated up to three times. If the transmission fails three times, it is judged that some trouble occurs on communications, and an alarm message indicating this condition is displayed. Then, the transmission process is ended. When the transmission process is ended, the connection to the Internet 5 is disconnected. B. Manufacturer Management Apparatus As shown FIGS. 1 and 3, the manufacturer management apparatus 20 is configured by connecting a data receiving processing section 21, an operation data storing section 22, a consumption degree evaluation processing section 23, a consumption degree data storing section 24, and an alarm output processing section 25 via a bus 26. The manufacturer management apparatus 20 is connected to the Internet 5 via a LAN, or the like, as required. An output apparatus 27 including a display device such as a CRT and a printing apparatus such as a printer is connected to the alarm output processing section 25.

The operation data storing section 22 is a functioning section which stores the operating condition data received by the data receiving processing section 21. The operation data storing section 22 includes a data table shown in FIG. 7 relating to the machine ID, (collection) date and time, main spindle load, main spindle rotation speed, tool replacement, tool clamp/unclamp, and the like, for each of the NC machine tools 15, and stores the operating condition data corresponding to the items. The operation data storing section 22 stores the data while previously correlating the data table with the mail address of the source (i.e., the user) of the operating condition data.

The data receiving processing section 21 receives an electronic mail transmitted from each user management apparatus 10 to the mail server 28, analyzes the received electronic mail, and updates the operating condition data of the corresponding NC machine tool 15 of the data table corresponding to the source mail address, with the operating condition data included in the corresponding electronic mail.

Specifically, the processes described below are sequentially performed. First, connection to the mail server 28 is performed.

When the connection is successfully performed, a mail is taken out from the mail server 28, and a process of deleting the mail in the mail server 28 is then performed. Thereafter, the received mail is analyzed, and the operating condition data of the corresponding NC machine tool 15 is updated with the operating condition data included in the electronic mail.

As described above, the text of the electronic mail is constituted by a tag for defining an item relating to an operating condition and operating condition data corresponding to the item, and the text has a form in which the operating condition data is described with being sandwiched by corresponding tags. When the tags are recognized, therefore, the item relating to the operating condition and the corresponding operating condition data can be identified.

The data receiving processing section 21 analyzes the tag, and recognizes the corresponding machine ID, i.e., the NC machine tool 15, the operating condition item, the operating condition data, and the like. Then, the operating condition data of the corresponding NC machine tool 15 stored in the operation data storing section 22 is updated by a process such as summing, adding, or overwriting.

After the data updating process is performed as described above, the process waits for a predetermined time period which is previously set. Then, the above-described series of processes is repeated. If the connection to the mail server 28 fails, the above-described series of processes is also repeated after the predetermined time period elapses.

The consumption degree data storing section 24 is a functioning section which stores data of the consumption degree of each driving mechanism section calculated by the consumption degree evaluation processing section 23. The consumption degree data storing section 24 includes a data table for the main spindle apparatus 33, the automatic tool exchange apparatus 36, and the like, for each of the NC machine tools 15, and stores consumption degree data corresponding to the items. The consumption degree data storing section 24 stores the data while previously correlating the data table with the mail address of the user.

On the basis of the operating condition data stored in the operation data storing section 22, the consumption degree evaluation processing section 23 calculates at any time the consumption degree of each of the driving mechanism sections such as the main spindle apparatus 33 and the automatic tool exchange apparatus 36, that is, the consumption degrees of consumable components such as the bearing 41 and the coned disc spring 46 of the main spindle apparatus 33, and the bearings (not shown) of the cam followers 55 and 56 of the automatic tool replacing apparatus 36. By using the calculated consumption degree data, the consumption degree evaluation processing section 23 updates the consumption degree data stored in the consumption degree data storing section 24.

Specifically, with respect to the bearing 41, for example, the consumption degree $L_{act}$ can be calculated by following Expression 1:

$$L_{act} = \sum_{n=1}^{n} \frac{N_n}{(C/P_n)^3} \quad (1)$$

In the expression, $N_n$ indicates an accumulated number of rotations of the main spindle 34 (obtained by totalizing the number of rotations of the main spindle 34), and is calculated based on the main spindle rotation speed obtained from the numerical control section 17. The letter C indicates a basic dynamic load capacity which is a specific constant for the bearing 41. In addition, $P_n$ indicates a dynamic equivalent load which is calculated by using following Expression 2 based on the main spindle load obtained from the numerical control section 17:

$$P_n = X \cdot F_{rn} + Y \cdot F_{an} \quad (2)$$

In the expression, X and Y are constants, $F_{rn}$ indicates a radial load, and $F_{an}$ indicates an axial load. The radial load $F_{rn}$ is the above-described main spindle load, and calculated based on the data obtained from the load meter. The axial load $F_{an}$ is calculated by following Expression 3 based on the thus-obtained radial load $F_{rn}$:

$$F_{rn} = a \cdot (b \cdot F_{an})^c \quad (3)$$

In Expression 3, a, b, and c are constants determined by a workpiece material. This Expression 3 is established in the case of end mill. In the case of another kind of machining such as milling or drilling, therefore, the axial load $F_{an}$ is calculated by using an expression in accordance with the machining.

In this way, based on the main spindle load and the main spindle rotation speed per second which are transmitted from the user management apparatus 10 and stored in the operation data storing section 22, the consumption degree $L_{act}$ is calculated in accordance with Expression 1. In Expression 1, $(C/P)^3$ means the accumulated number of rotations of the bearing 41 under a constant load until the life of the bearing 41 is ended. As seen from the expression, the consumption degree $L_{act}$ is obtained by summing up the consumption degree per second.

Then, the consumption degree evaluation processing section 23 updates the consumption degree data ($L_{act}$) stored in the consumption degree data storing section 24, with the calculated consumption degree data ($L_{act}$). The value when the life of the bearing 41 is ended, that is, the life-end value $L_{max}$ is $L_{max}=1$, and previously stored in the consumption degree data storing section 24, as required.

On the other hand, with respect to the coned disc spring 46, the number of tool clamping/unclamping operations stored in the operation data storing section 22 is accumulated, and the resulting accumulated number is used as the consumption degree $L_{act}$.

In the case where the coned disc spring 46 is subjected to a repetitive load to repeatedly operate, the life of the coned disc spring is evaluated in accordance with the accumulated operation number. Usually, the accumulated operation number is obtained as an empirical value. When the operation number of the clamp mechanism 47, more specifically, that of the coned disc spring 46 is counted and accumulated, therefore, the consumption degree of the coned disc spring 46 can be evaluated. Consequently, in the embodiment, the accumulated number obtained by totalizing the number of tool clamping/unclamping operations of the clamp mechanism 47 is used as the consumption degree Similarly, the consumption degree evaluation processing section 23 updates the consumption degree data ($L_{act}$) stored in the consumption degree data storing section 24, with the calculated consumption degree data ($L_{act}$).

The value at which the life of the coned disc spring 46 is ended (the number of operations), that is, the life value $L_{max}$ is calculated as exemplarily shown below, and is previously stored in the consumption degree data storing section 24, as required.

Figure 10:
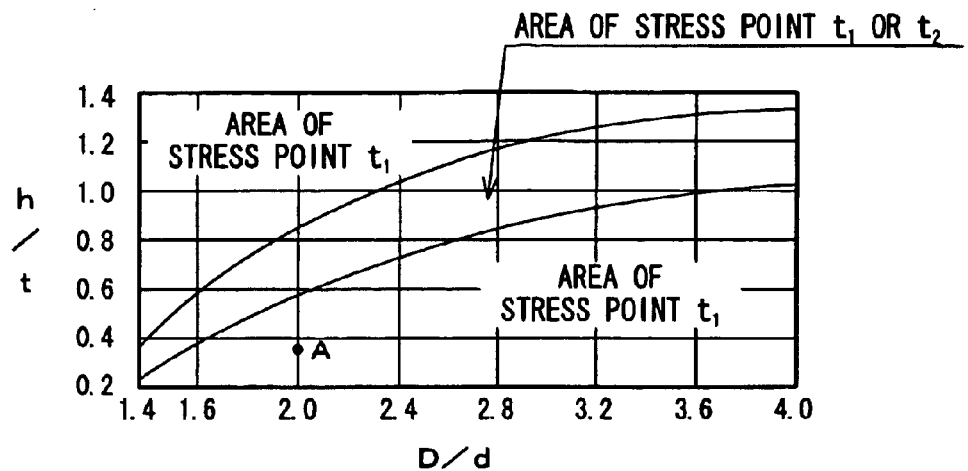
FIG. 10 is a view illustrating evaluation of a consumption degree in the embodiment.

Specifically, first, the stress $\sigma_t$ which acts on the coned disc spring 46 in a mounting process, and the maximum stress $\sigma_m$ in the case where the maximum load acts thereon are calculated based on following Expression 4 or 5, and the graph shown in FIG. 10. Expressions 4 and 5 are Almen-Laszlo equations.

$$\sigma_{t1} = \frac{4 \cdot E \cdot C}{(1-v^2) \cdot D^2} \cdot \delta \cdot \left\{ -\beta \cdot \left(h - \frac{\delta}{2}\right) + \gamma t \right\} \quad (4)$$

$$\sigma_{t2} = \frac{4 \cdot E \cdot C}{(1-v^2) \cdot D^2} \cdot \frac{\delta}{\alpha} \cdot \left\{ (2\gamma - \beta) \cdot \left(h - \frac{\delta}{2}\right) + \gamma t \right\} \quad (5)$$

In the above, E denotes a modulus of longitudinal elasticity, v denotes the Poisson's ratio, δ denotes a deflection of the coned disc spring 46, D denotes the outer diameter of the coned disc spring 46, β is a stress factor, h denotes the height of the coned disc spring 46, γ denotes a stress factor, t denotes the thickness of the coned disc spring 46, and C is a coefficient obtained from an initial value.

When the mounting load $P_i$ is 5,978 N, the maximum load $P_m$ is 8,232 N, the outer diameter D of the coned disc spring 46 is 54 mm, the inner diameter d is 25.4 mm, the height his 1.1 mm, and the thickness t is 3.0 mm, D/d is about 2.0, and h/t is about 0.37. This is plotted as a point A in the graph of FIG. 10. The area to which the point A belongs is an area in which the stress point is t1, and hence the stress $\sigma_i$ in mounting and the maximum stress $\sigma_{max}$ can be calculated by using Expression 4. Results of the calculations using Expression 4 are listed in Table 1 below.

TABLE 1

| | Load P (N) | Deflection δ (mm) | Stress σ (MPa) |
|---|---|---|---|
| In mounting (i) | 5978 | 0.39 | 617.4 |
| Maximum (m) | 8232 | 0.55 | 901.6 |

Figure 11:
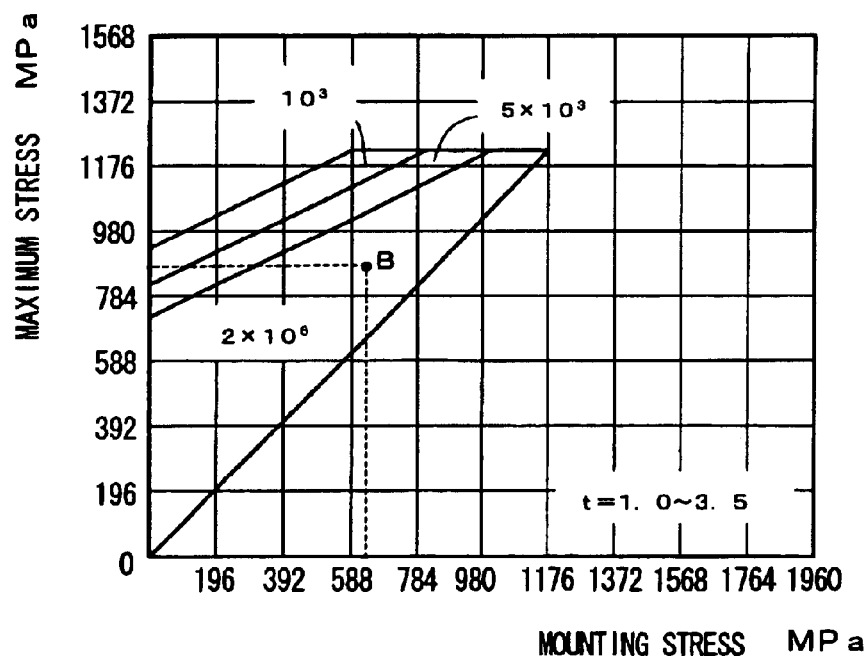
FIG. 11 is a view illustrating evaluation of a consumption degree in the embodiment.

Next, based on the calculated stress $\sigma_i$ in mounting, and the maximum stress $\sigma_n$, and the graph shown in FIG. 11, the number of operations by which the life of the coned disc spring 46 is ended is determined. The graph shown in FIG. 11 is a graph which shows an endurance limit obtained on the basis of the stress $\sigma_i$ in mounting and the maximum stress $\sigma_m$, and which is obtained empirically.

In the case where the stress $\sigma_i$ in mounting in the above example is 617.4 MPa and the maximum stress $\sigma_m$ is 901.6 MPa, this is plotted as point B in FIG. 11. Thus, the number of $2 \times 10^6$ is obtained as the life value $L_{max}$.

With respect to the bearings (not shown) of the cam followers 55 and 56 of the automatic tool exchange apparatus 36, first, the number of tool exchange operations stored in the operation data storing section 22 is accumulated, and the resulting accumulated number is used as the consumption degree $L_{max}$.

The life of a bearing can be evaluated by the accumulative time period of operation when the bearing operates in a constant load condition. When the loads acting on the bearings of the cam followers 55 and 56 are known (such a load can be recognized as a theoretical value on design), therefore, it is possible to calculate a theoretical operation time period to elapse until the life of the bearing is ended. On the other hand, the time period required for one operation of replacing a tool is usually constant, so that the operation time can be easily measured. Also the operation time period of each bearing occupied by the tool exchange operation can be actually measured or theoretically calculated.

Accordingly, by counting the number of operations for exchanging the tool and summing up the number, the accumulative operation time of respective bearing can be calculated, and the consumption degree of the bearing can be evaluated from the calculated accumulative operation time. In the embodiment, therefore, the life which is previously calculated is divided by the time period required for one operation, and the number of operations until the life is ended is calculated as the life value $L_{max}$. The number of actual operations for exchanging the tool is accumulated, and the obtained value is used as the consumption degree $L_{act}$.

Specifically, the operation time period (lifetime) $L_h$ until the life of the bearing of the cam follower 55 or 56 is ended is calculated in accordance with following Expression 6:

$$L_h = (a/C_h)/(F_h \cdot N_h^{0.3}) \quad (6)$$

In the expression, a is a constant, $C_h$ is a dynamic load capacity (constant) of the bearing, $F_h$ is a load acting on the bearing, and $N_h$ is the number of rotations of the bearing.

Next, the operation time period of each bearing in one tool exchange operation is obtained by an actual measurement or a theoretical calculation. The lifetime $L_h$ of each bearing calculated by Expression 6 is divided by one (tool exchange) operation time period for respective bearing, and the number of tool replacement operations at which the life reaches the end is calculated for each bearing. Among the calculated numbers of the tool replacing operations, the minimum value is set as the life value $L_{max}$ of the bearings of the cam followers 55 and 56.

The consumption degree evaluation processing section 23 similarly updates the consumption degree data ($L_{act}$) stored in the consumption degree data storing section 24, with the calculated consumption degree data ($L_{act}$). The life value $L_{max}$ calculated in the above-described manner is previously stored in the consumption degree data storing section 24.

The alarm output processing section 25 monitors at any time whether the consumption degree data stored in the consumption degree data storing section 24 exceeds a predetermined reference value or not. If the data exceeds the reference value, an alarm indicating this condition is output to the output apparatus 27.

The reference value is a value indicating that the life of a consumable component comes close to the end thereof. For example, a value of 80% of the life value $L_{max}$ is appropriately set as the reference value.

The alarm may be output in the following manner. For example, information of the driving mechanism sections (the bearing 41 and the coned disc spring 46 of the main spindle apparatus 33, the bearings (not shown) of the cam followers 55 and 56 of the automatic tool exchange apparatus 36, and the like), the reference values relating to the consumption degrees thereof, the NC machine tool 15 having the driving mechanism sections (machine ID or the like), the user operating the NC machine tool 15, and so on is displayed on the screen of the display device. Alternatively, similar information may be printed out by the printing apparatus.

According to the thus configured maintenance system 1 of the embodiment, first, the data transmission processing section 11 of each of the user management apparatuses 10 collects the operating condition data of each driving mechanism section of the corresponding NC machine tool 15 from the numerical control section 17 of the NC apparatus 16. The collected operating condition data is accumulated in the operation data storing section 12.

When a predetermined transmission condition is satisfied, the accumulated operating condition data is automatically organized into an electronic mail having a configuration in which a tag for defining an item of an operating condition is related to the operating condition data corresponding to the item. The organized electronic mail is transmitted to the manufacturer management apparatus 20 via the mail servers 14 and 28.

The transmitted electronic mail is received by the data receiving processing section 21 of the manufacturer management apparatus 20. Thereafter, the electronic mail is analyzed, so as to recognize the source mail address, the NC machine tool 15 corresponding to the tag, the operating condition item, the operating condition data, and the like. The recognized operating condition data of the driving mechanism sections of the NC machine tool 15 stored in the operation data storing section 22 is updated by a process such as summing, adding, or overwriting.

The consumption degree evaluation processing section 23 calculates at any time the consumption degree of each of the driving mechanism sections such as the main spindle apparatus 33 and the automatic tool exchange apparatus 36, based on the operating condition data stored in the operation data storing section 22. The consumption degree data stored in the consumption degree data storing section 24 is updated with the calculated consumption degree data.

The consumption degree data stored in the consumption degree data storing section 24 is monitored at any time by the alarm output processing section 25. When it is checked that the consumption degree data exceeds the predetermined reference value, the alarm information indicative of the condition is output through the output apparatus 27.

As described above, according to the maintenance system 1 of the embodiment, the consumption degree of the driving mechanism section of each NC machine tool 15 is evaluated and monitored at any time. When the consumption degree exceeds the predetermined reference value, that is, when the life of the consumable component of the driving mechanism section comes close to the end thereof, an alarm is output. Based on the output alarm, therefore, the manufacturer can easily know a consumable component the life of which comes close to the end thereof, and predict when, which, and how many consumable components are required. Consequently, it is unnecessary to store an excess number of consumable components, and the number of stocks can be greatly reduced.

The manufacturer can perform maintenance services for the users, such as that the manufacturer prompts in advance the users to replace the components, or that the manufacturer sends in advance a component required for the replacement to the users. Therefore, the service for the users can be improved.

On the other hand, the user can know the timing when the life of a consumable component is ended, based on the information supplied from the manufacturer, so that it is possible to systematically perform the maintenance of the NC machine tool 15 by replacing the component before the life is ended. Accordingly, the operating efficiency and the productivity of the NC machine tool 15 can be improved.

Since it is possible to systematically perform the maintenance of the NC machine tool 15 as described above, disadvantages such as that the maintenance person must repair the NC machine tool 15 in the holiday or nighttime can be eliminated.

Irrespective of the places where the user management apparatus 10 as the source and the manufacturer management apparatus 20 as the destination are installed, the operating condition data collected and accumulated by the user management apparatus 10 can be flexibly transmitted from the user management apparatus 10 to the manufacturer management apparatus 20, simply by designating the address of the destination. In addition, data without any omission in terms of time can be transmitted to the manufacturer management apparatus 20.

The electronic mail transmitted from the user management apparatus 10 to the manufacturer management apparatus 20 has a structure in which an item relating to an operating condition and data of the operating condition are correlated with each other, so that the correspondence relationship between the operating condition item and the operating condition data can be easily known. Therefore, the data updation in the data receiving processing section 21 can be more correctly performed. The items of data to be accumulated can be easily added and changed.

The user management apparatus 10 is connected to the Internet 5 only when the electronic mail is to be transmitted. Therefore, safety from any unauthorized access and computer virus can be greatly increased.

The operating condition data accumulated in the operating condition data storing section 12 is automatically transmitted when a predetermined transmission condition is satisfied. Thus, it is possible to prevent data to be accumulated in the operation data storing section 12 from being discarded because the data amount exceeds the capacity of the storing section. Therefore, the operating condition data can be made more correct.

In the above, an embodiment of the invention has been described. It is a matter of course that specific modes in which the invention can be realized are not restricted to this.

In the above-described embodiment, the operating condition data is transmitted in the form of an electronic mail via the mail servers 14 and 28. The invention is not restricted to this. Alternatively, file transferring means such as FTP (File Transfer Protocol), TFTP (Trivial FTP), or HTTP (Hyper Text Transfer Protocol) may be used.

In the above-described embodiment, the user management apparatus 10 is disposed separately from the NC apparatus 16. The invention is not limited to this. Alternatively, the same function as the user management apparatus 10 may be integrally provided in the NC apparatus 16.

The user management apparatuses 10 are disposed in a one-to-one relationship with respect to the NC apparatus 16. The invention is not limited to this. Alternatively, NC apparatuses 16 of a plurality of NC machine tools 15 may be connected to one user management apparatus 10.

Moreover, the manufacturer management apparatus 20 may be configured by a plurality of computers such as: a computer which is dedicated to data accumulation, and which receives data from the user management apparatus 10 and stores the data; and a computer which is dedicated to alarm output, and which evaluates the consumption degree of the driving mechanism section and outputs the alarm.

In the embodiment, the bearing 41 and the coned disc spring 46 of the main spindle apparatus 33, and the bearings (not shown) of the cam followers 55 and 56 of the automatic tool exchange apparatus 36 have been exemplarily described. The invention is not limited to these. Alternatively, the invention may be applied to consumable components of other driving mechanism sections.

In the maintenance system 1 of the above-described embodiment, the user management apparatus 10 is constituted by the data transmission processing section 11 and the operation data storing section 12, and the manufacturer management apparatus 20 is constituted by the data receiving processing section 21, the operation data storing section 22, the consumption degree evaluation processing section 23, the consumption degree data storing section 24, and the alarm output processing section 25. The invention is not limited to such a configuration. Alternatively, the user management apparatus and the manufacturer management apparatus may be configured in the following manner.

Figure 12:
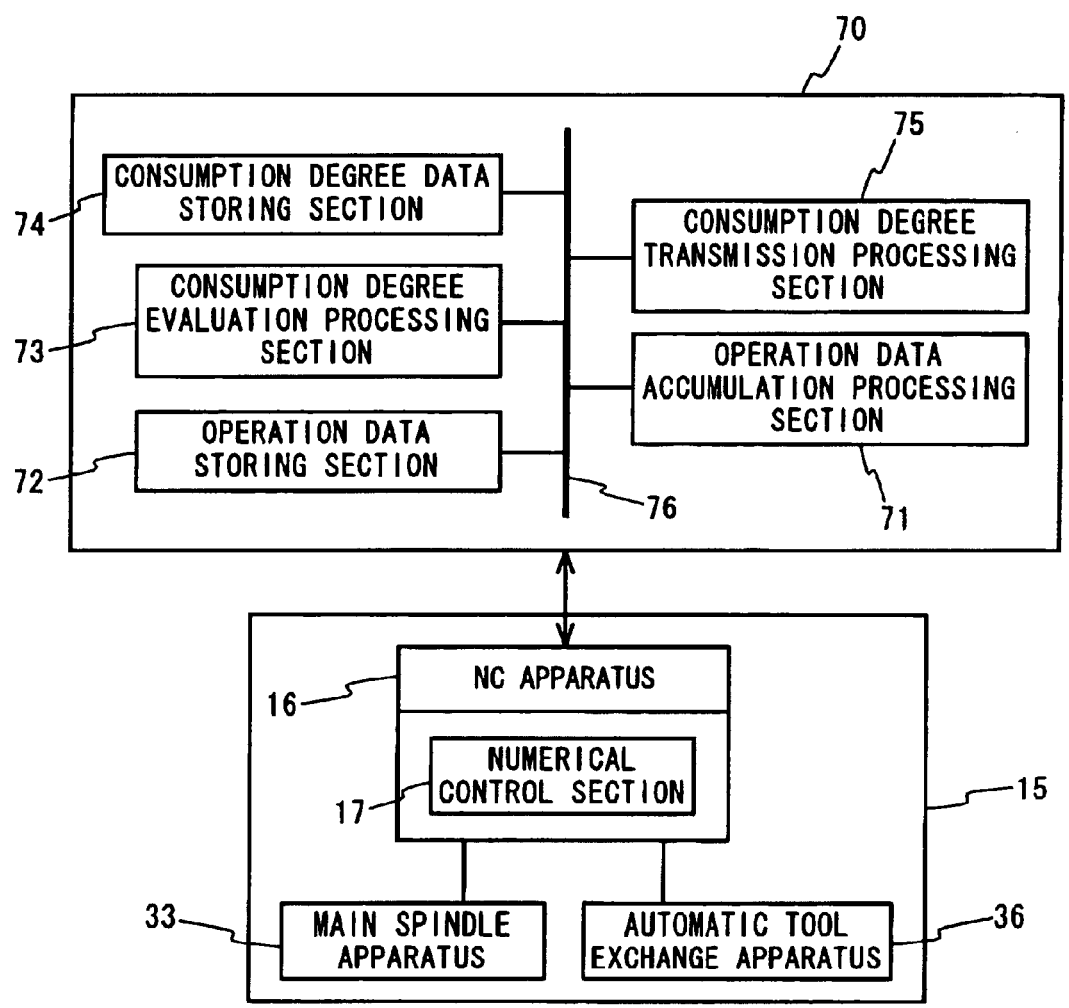
FIG. 12 is a block diagram schematically showing the configuration of a user management apparatus and an NC machine tool in another embodiment of the invention.

As shown in FIG. 12, in a user management apparatus 70, a data accumulation processing section 71, an operation data storing section 72, a consumption degree evaluation processing section 73, a consumption degree data storing section 74, and a consumption degree transmission processing section 75 are connected to one another via a bus 76.

The operation data storing section 72 is a storing section which is similar to the operation data storing section 12, and stores operating condition data collected by the operation data accumulation processing section 71. The consumption degree data storing section 74 is a storing section which is similar to the consumption degree data storing section 24, and stores consumption degree data evaluated by the consumption degree evaluation processing section 73.

The data accumulation processing section 71 is configured so as to perform the same process as the accumulation process in the data transmission processing section 11, and performs a process of obtaining data relating to the operating condition of driving mechanism sections from the numerical control section 17, and storing the data into the operation data storing section 72. In the same manner as the consumption degree evaluation processing section 23, the consumption degree evaluation processing section 73 evaluates at any time the consumption degree of the driving mechanism sections based on the operating condition data stored in the operation data storing section 72, and updates the consumption degree data stored in the consumption degree data storing section 74 with the evaluated consumption degree data.

The consumption degree transmission processing section 75 monitors at any time whether the consumption degree data stored in the consumption degree data storing section 74 exceeds a predetermined reference value or not. If the data exceeds the reference value, information of the consumption degree is transmitted in the form of an electronic mail to the manufacturer management apparatus via the mail servers 14 and 28.

The electronic mail is constituted by a header portion including source and destination mail addresses and the like, and a mail text portion, as shown in FIG. 13. The mail text portion includes information of the driving mechanism sections (the bearing 41 and the coned disc spring 46 of the main spindle apparatus 33, the bearings (not shown) of the cam followers 55 and 56 of the automatic tool exchange apparatus 36, and the like), the reference values for the consumption degree thereof, the NC machine tool 15 (machine ID, and the like), the user who uses the NC machine tool 15, etc.

The consumption degree transmission processing section 75 is connected to the Internet 5 only when an electronic mail is to be transmitted, so as to transmit the electronic mail. After the transmission is completed, the connection to the Internet 5 is disconnected.

On the other hand, although not particularly shown in the figures, the manufacturer management apparatus comprises a consumption degree receiving processing section, a received data storing section, an input device such as a keyboard and a mouse, a display device such as a CRT, and a printing apparatus such as a printer.

The received data storing section is a functioning section which stores the electronic mails received by the consumption degree receiving processing section. The consumption degree receiving processing section receives the electronic mails transmitted from the respective user management apparatuses 70 via the mail servers 14 and 28, and stores the electronic mails into the received data storing section.

In response to an input through the input device, the electronic mails stored in the received data storing section are displayed on the screen of the display device, or output from the printing apparatus.

According to the user management apparatus 70 and the manufacturer management apparatus which are configured as described above, the consumption degree of the driving mechanism section of the NC machine tool 15 is evaluated and monitored at any time. When the consumption degree exceeds the predetermined reference value, that is, when the life of a consumable component of the driving mechanism section comes close to the end thereof, information of the consumption degree is transmitted from the user management apparatus 70 to the manufacturer management apparatus. Based on the transmitted information, therefore, the manufacturer can easily know the consumable component the life of which is close to the end thereof. Consequently, both of the manufacturer and the user can enjoy the same effects as those in the above-described

What is claimed is:

1. A maintenance system for machine tool, comprising: one or more user management apparatuses connected to numerical control sections of one or more machine tools each including a driving mechanism section, and said numerical control section which controls an operation of the driving mechanism section; and a manufacturer management apparatus disposed on a side of a manufacturer who manufactures said machine tools, said user management apparatuses and said manufacturer management apparatus being connectable to each other via an Internet, wherein each of said user management apparatuses comprises:

user-side operation data storing means for storing data relating to an operating condition of said driving mechanism section of each of said machine tools; and data transmitting means for collecting data relating to the operating condition of said driving mechanism section from said numerical control section, for accumulating the data into said user-side operation data storing means, for checking whether a predetermined transmission condition is satisfied or not, and for, only when the transmission condition is satisfied, transmitting the operating condition data of said driving mechanism section accumulated in said user-side operation data storing means to said manufacturer management apparatus, in a data form of an electronic mail, and said manufacturer management apparatus comprises:

manufacturer-side operation data storing means for storing operating condition data of said driving mechanism sections received from said user management apparatuses;

data receiving means for receiving the operating condition data of said driving mechanism sections transmitted from said user management apparatuses, and for updating operating condition data stored in said manufacturer-side operation data storing means with the received operating condition data;

consumption degree data storing means for storing data relating to a consumption degree of each of said driving mechanism sections;

consumption degree evaluating means for evaluating at any time the consumption degree of each of said driving mechanism sections, based on the operating condition data of said driving mechanism section stored in said manufacturer-side operation data storing means, and for updating consumption degree data stored in said consumption degree data storing means with the evaluated consumption degree data; and alarm outputting means for monitoring at any time whether the consumption degree data stored in said consumption degree data storing means exceeds a predetermined reference value or not, and for, when the consumption degree data exceeds the reference value, outputting an alarm indicating this condition.

2. A maintenance system for machine tool, comprising: one or more user management apparatuses connected to numerical control sections of one or more machine tools each including a driving mechanism section, and said numerical control section which controls an operation of the driving mechanism section; and a manufacturer management apparatus disposed on a side of a manufacturer who manufactures said machine tools, said user management apparatuses and said manufacturer management apparatus being connectable to each other via an Internet, wherein each of said user management apparatuses comprises:

user-side operation data storing means for storing data relating to an operating condition of said driving mechanism section of each of said machine tools; and data transmitting means for collecting data relating to the operating condition of said driving mechanism section from said numerical control section, for accumulating the data into said user-side operation data storing means, for checking whether a predetermined transmission condition is satisfied or not, for, only when the transmission condition is satisfied, generating transmission data based on the operating condition data of said driving mechanism section accumulated in said user-side operation data storing means, and for transmitting the generated transmission data to said manufacturer management apparatus, the transmission data having a configuration in which a data element identifier defining an item relating to the operating condition of said driving mechanism section is related to the operating condition data corresponding to the item, and said manufacturer management apparatus comprises:

manufacturer-side operation data storing means for storing operating condition data of said driving mechanism sections received from said user management apparatuses;

data receiving means for receiving the transmission data transmitted from said user management apparatus, for analyzing the data element identifier in the received transmission data, thereby recognizing an item relating to the operating condition of said driving mechanism section defined by the data element identifier, and for updating the operating condition data corresponding to the recognized item, stored in said manufacturer-side operation data storing means, with the received operating condition data;

consumption degree data storing means for storing data relating to a consumption degree of each of said driving mechanism sections;

consumption degree evaluating means for evaluating at any time the consumption degree of each of said driving mechanism sections, based on the operating condition data of said driving mechanism section stored in said manufacturer-side operation data storing means, and for updating consumption degree data stored in said consumption degree data storing means with the evaluated consumption degree data; and alarm outputting means for monitoring at any time whether the consumption degree data stored in said consumption degree data storing means exceeds a predetermined reference value or not, and for, when the consumption degree data exceeds the reference value, outputting an alarm indicating this condition.

3. A maintenance system for machine tool according to claim 1 or 2, wherein said data transmitting means is connected to the Internet only when the operating condition data accumulated in said user-side operation data storing means is to be transmitted to said manufacturer management apparatus, the operating condition data is then transmitted, and, after the transmission is completed, the connection to the Internet is disconnected.

4. A maintenance system for machine tool according to claim 1 or 2, wherein the transmission condition is a condition which is set for an amount of data accumulated in said user-side operation data storing means, and said data transmitting means compares the data amount accumulated in said user-side operation data storing means with a reference data amount serving as the transmission condition, and, when the accumulated data amount reaches the reference data amount, transmits the operating condition data accumulated in said user-side operation data storing means to said manufacturer management apparatus.

5. A maintenance system for machine tool according to claim 1 or 2, wherein the transmission condition is a condition which is set for a time period required for the data accumulation, and said data transmitting means compares the time period required for the data accumulation with a reference time period serving as the transmission condition, and, when the time period of the data accumulation exceeds the reference time period, transmits the operating condition data accumulated in said user-side operation data storing means to said manufacturer management apparatus.

6. A maintenance system for machine tool, comprising: one or more user management apparatuses connected to numerical control sections of one or more machine tools each including a driving mechanism section, and said numerical control section which controls an operation of the driving mechanism section; and a manufacturer management apparatus disposed on a side of a manufacturer who manufactures said machine tools, said user management apparatuses and said manufacturer management apparatus being connectable to each other via an Internet, wherein each of said user management apparatuses comprises:

operation data storing means for storing data relating to an operating condition of said driving mechanism section of each of said machine tools;

data accumulating means for collecting data relating to the operating condition of said driving mechanism section from said numerical control section, and for accumulating the data into said operation data storing means;

consumption degree data storing means for storing data relating to a consumption degree of said driving mechanism section of said machine tool;

consumption degree evaluating means for evaluating at any time the consumption degree of said driving mechanism section, based on operating condition data of said driving mechanism section stored in said operation data storing means, and for updating consumption degree data stored in said consumption degree data storing means with the evaluated consumption data; and consumption degree transmitting means for monitoring at any time whether the consumption degree data stored in said consumption degree data storing means exceeds a predetermined reference value or not, and for, when the data exceeds the reference value, transmitting information of the consumption degree in the form of an electronic mail to said manufacturer management apparatus.

7. A maintenance system for machine tool according to claim 6, wherein said consumption degree transmitting means is connected to the Internet only when the information of the consumption degree is to be transmitted to said manufacturer management apparatus, the information of the consumption degree is then transmitted, and, after the transmission is completed, the connection to the Internet is disconnected.

* * * * *